United States Patent

Cannan et al.

[11] Patent Number: 5,133,862
[45] Date of Patent: Jul. 28, 1992

[54] FLEXIBLE MEMBRANE DIFFUSER

[75] Inventors: Milton R. Cannan, Willow Grove; Robert J. Cepil, Souderton; Howard L. Pentz, Lansdale; Thomas W. Quimby, Hatboro, all of Pa.

[73] Assignee: FMC Corporation, Chicago, Ill.

[21] Appl. No.: 648,701

[22] Filed: Jan. 31, 1991

[51] Int. Cl.$^5$ .............................. B01D 61/18
[52] U.S. Cl. .................. 210/321.75; 55/158; 210/321.84
[58] Field of Search ............... 210/640, 321.6, 321.72, 210/321.75, 321.84; 55/158, 16

[56] References Cited

U.S. PATENT DOCUMENTS

| | | | |
|---|---|---|---|
| 3,396,950 | 8/1968 | Wood | 261/122 |
| 3,432,154 | 11/1967 | Danjes . | |
| 3,642,260 | 2/1972 | Danjes et al. | 261/122 |
| 4,038,191 | 7/1977 | Davis et al. | 210/321.6 |
| 4,261,932 | 4/1981 | Ewing et al. | 261/122 |
| 4,261,933 | 4/1981 | Ewing et al. | 261/122 |
| 4,288,395 | 9/1981 | Ewing et al. | 261/122 |
| 4,569,805 | 2/1986 | Hume et al. | 261/122 |
| 4,625,715 | 12/1986 | Bucher | 128/66 |
| 4,631,134 | 12/1986 | Schussler | 210/758 |
| 4,734,191 | 3/1988 | Schussler | 210/220 |
| 4,764,314 | 8/1988 | Schneider | 261/62 |

FOREIGN PATENT DOCUMENTS 3124233  5/1983  Fed. Rep. of Germany .
824376  11/1959  United Kingdom .

Primary Examiner—Frank Sever
Attorney, Agent, or Firm—J. Preston Oxenham; Richard B. Megley

[57] ABSTRACT

The instant invention provides a diffuser comprising a rectangular frame with a tope edge and a bottom edge; a base plate attached to said bottom edge at a base plate perimeter and having a gas inlet through which gas can flow; a top plate with an upper surface and an inner surface said top plate attached to said top edge at a top plate perimeter and having an aperture through which gas can flow; a flexible, generally gas-impermeable membrane lying above said top plate and attached to said top edge at a membrane perimeter, said membrane including a central porous portion with a boundary defined by an ellipse.

11 Claims, 1 Drawing Sheet

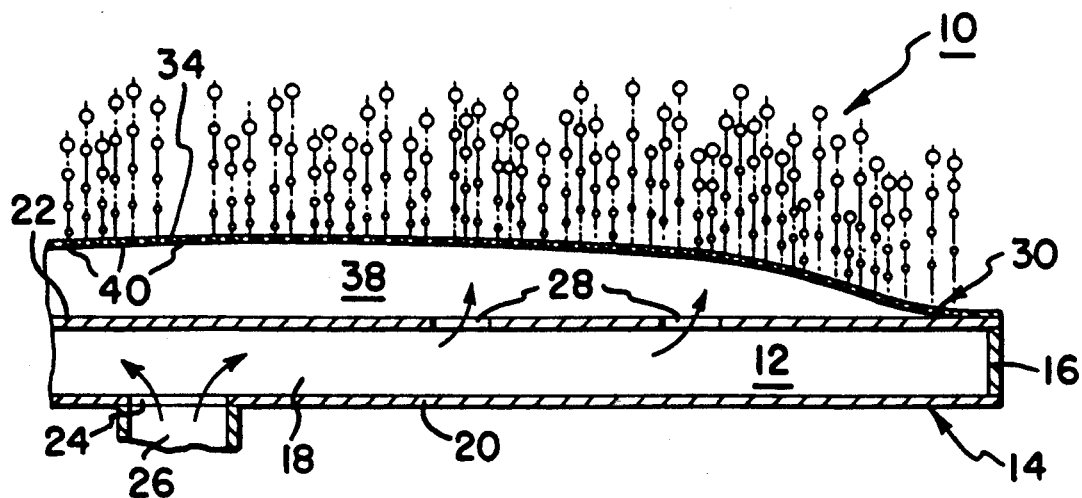
FIG_1
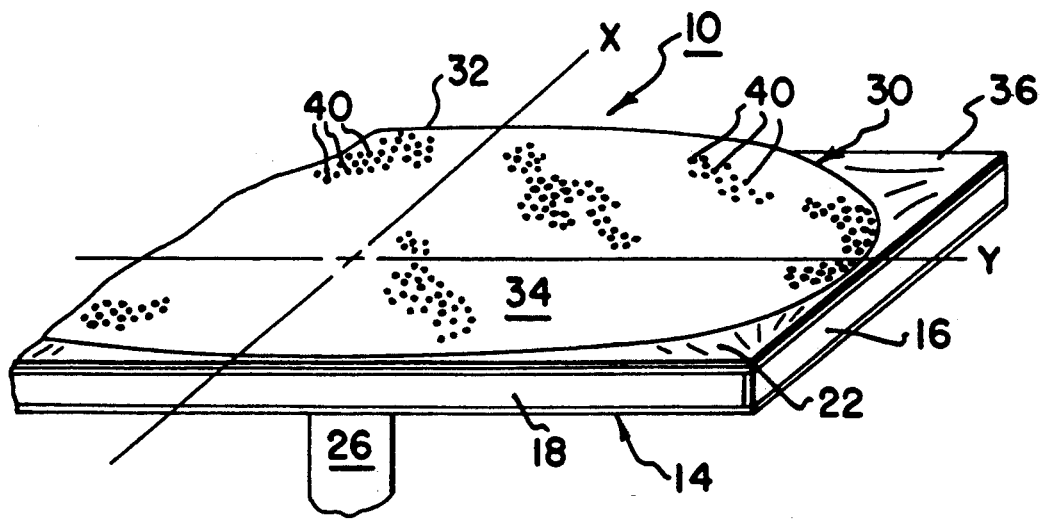
FIG_2
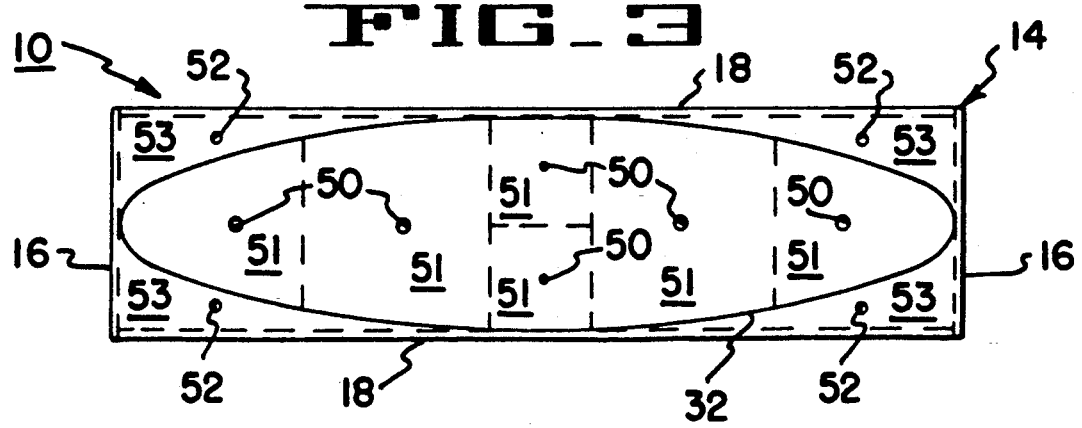
FIG_3

FLEXIBLE MEMBRANE DIFFUSER

TECHNICAL FIELD

The present invention relates to diffusers used to dissolve gases in liquids. More particularly, the present invention relates to devices for bubbling gases through liquids to facilitate dissolution of the gas in the liquid. Most particularly, the present invention relates to diffusion devices used to dissolve air into water in waste water treatment processes such as the activated sludge process.

BACKGROUND OF THE INVENTION

There are processes, such as the activated sludge process and its modifications, used in waste water treatment where efficient dissolution of gas into liquid is required. In that process, air is disolved into clouded water contaminated with suspended biological mass. To maximize gas dissolution, or transfer, in such a process, a device which releases micron size gas bubbles into the liquid with the least energy requirement and which has a low potential for clogging is desired. Flexible membrane diffuser devices in which gas is forced through micron size pores in an otherwise gas impermeable membrane to bubble upward through a liquid are particularly well suited for this application because, when the device is not in use, the pores through which gas is forced to form bubbles are effectively sealed preventing material which may clog the pores and interfere with efficient diffuser operation from entering the system when gas is not being forced through it. Flexible-membrane devices of the prior art have typically been of round tubular or circular geometry. When such devices have been made in a rectangular plan form with a membrane of uniform porosity and rectangular shape, large stresses which occur in the membrane proximate to its square corners have caused large variations in gas flow rate over the membrane surface resulting in low diffuser efficiency.

DISCLOSURE OF THE INVENTION

It is an object of the present invention to provide a uniform flow of gas over the entire porous surface of a flexible membrane.

It is a further object of the present invention to provide an efficient gas diffuser which is inexpensive to manufacture.

It is yet a further object of the present invention to provide a gas diffuser of rectangular plan form to allow cost affective patterns of arrangement when multiple diffuser devices are used in a process.

It is also an object of the present invention to provide a diffuser of rectangular or square plan form which will provide uniform gas flow over the porous surface of the diffuser membrane.

The diffuser of the present invention comprises a lower plenum chamber of rectangular plan form, having a width "w" and a length "l", with a bottom panel having a gas inlet and a top panel having an inside and an outside surface and apertures through which gas may escape. A generally gas impermeable flexible membrane is attached to the outside of the top panel at their mutual perimeters. The membrane has a central uniformly porous portion with a boundary defined by an ellipse according to the equation $$\frac{x^2}{w^2} + \frac{y^2}{l^2} = \frac{1}{4},$$

the major axis of the ellipse bisecting the width of the membrane and the minor axis of the ellipse bisecting its length.

When pressurized gas is introduced into the plenum through the inlet in the bottom panel, pressurized gas flows through the plenum and the apertures in the top panel to create a pressurized space between the membrane and top panel which acts as a second or upper plenum. The gas may then escape through the porous area of the membrane.

In a preferred embodiment of the invention, the top plate has a plurality of apertures including inner apertures and outer apertures. Each of the inner apertures is located at the centroid of an inner area of the top plate contained entirely within an ellipse defined by the equation $$\frac{x^2}{w^2} + \frac{y^2}{l^2} = \frac{1}{4},$$

the ellipse having a major axis bisecting the plate width and a minor axis bisecting the plate length. Each inner aperture is sized in proportion to its inner area by a uniform inner proportion. Each of the outer apertures is located at the centroid of an outer area of the top plate lying entirely outside of the ellipse, each of the outer apertures is sized in proportion to its outer area by a uniform outer proportion which is larger than the inner proportion, preferably twice the inner proportion.

BRIEF DESCRIPTION OF THE DRAWINGS

FIG. 1 is a partial sectional view of a flexible membrane diffuser comprising an embodiment of the present invention.

FIG. 2 is a partial isometric pictorial drawing of a flexible membrane diffuser comprising an embodiment of the present invention.

FIG. 3 is a schematic illustration of the location and sizing of gas apertures in the upper panel of the lower diffuser chamber of a flexible membrane diffuser comprising an embodiment of the present invention.

DETAILED DESCRIPTION OF THE INVENTION

FIG. 1 is a partial sectional view of flexible membrane diffuser 10 comprising a preferred embodiment of the present invention. Lower plenum 12 of flexible membrane diffuser 10 is of rectangular plan form and includes a perimeter frame 14 including end walls 16 and side walls 18. Rectangular bottom plate 20 is attached to perimeter frame 14 at its perimeter and includes gas inlet 24 adapted for connection to a gas source such as conduit 26. Rectangular top plate 22 is attached to a top edge of perimeter frame 14 and is provided with apertures 28.

Membrane 30 is fabricated of gas impermeable material, for example, rubber or neoprene, and lies generally above top plate 22. Membrane 30 is sealingly attached to top plate 22 at a mutual perimeter of membrane 30 and top plate 22. Membrane 30 includes an inner porous portion 34 within an elliptical boundary 32. Porous portion 34 is provided with numerous, uniformly distributed, micron size pores. Outer portion 36 of membrane 30 located between ellipse 32 and the perimeter of membrane 30 is non-porous, and gas impermeable.

In the preferred embodiment of FIGS. 1 and 2, elliptical boundary 32 is defined by the equation $$\frac{x^2}{w^2} + \frac{y^2}{l^2} = \frac{1}{4},$$

where "w" is the width of plenum 12, the length of end members 16, and "l" is the length of plenum 12, the length of side members 18. Elliptical boundary 32 is located such that its minor axis bisects the length of the plenum and its major axis bisects the width of the plenum, and is thus tangent to the perimeter of membrane 30 at points at the center of the top edges of end members 16 and side members 18.

When gas under pressure is introduced through conduit 26 and inlet 24 into plenum 12 of flexible membrane diffuser 10 the pressurized gas escapes through apertures 28 and creates an upper plenum 38 between upper plate 22 and membrane 30 within which the gas pressure is substantially uniform. The high pressure gas will then escape from upper plenum 38 through pores 40, uniformly over the entire porous surface 34, to form bubbles in the overlying liquid. No pores are located in areas of high stress in perimeter area 36 proximate to the corners of the rectangular plan form as the high stress in these areas will result in higher flow rates of gas as compared to the lower stress areas of porous portion 34 within ellipse 32. By providing pores only over elliptical porous portion 34, a uniform flow of gas through pores 40 is obtained over the porous surface for maximum efficiency.

In the preferred embodiment of the present invention comprised by flexible membrane diffuser 10, apertures 28 of top plate 22 comprise inner apertures 50 and outer apertures 52, as may be seen in FIG. 3. In the preferred embodiment of FIG. 3 inner apertures 50 and outer apertures 52 are arranged in symmetrical patterns. Each of the inner apertures 50 is located at the centroid of an inner area 51 of the top panel which is contained entirely within an elliptical area on top plate 22 the boundary of which is defined by the equation $$\frac{x^2}{w^2} + \frac{y^2}{l^2} = \frac{1}{4},$$

The ellipse is located such that its minor axis bisects the length of rectangular frame 14 and its major axis bisects the width of frame 14. Each of the inner apertures 50 is sized in proportion to the inner area 51 of which the aperture 50 is located at the centroid. Outer apertures 52 are located at the centroids of outer areas 53 of the top plate lying entirely without the ellipse, and each of the outer apertures 52 is sized in proportion to the area of the outer area 53 of which the aperture 52 is located at the centroid.

In the preferred embodiment, the area of each of outer apertures of 52 is twice as large relative to the area of its outer area 53 as is the area of each of inner apertures 50 relate to the area of its respective inner area 51.

While an exemplary flexible membrane diffuser apparatus comprising a preferred embodiment of the present invention has been shown, it will be understood, of course, that the invention is not limited to that embodiment. Modifications may be made by those skilled in the art, particularly in view of the foregoing teachings. It is, therefore, contemplated by the appended claims to cover any such modifications which incorporate the essential features of the invention or which encompass the spirit and scope of the invention.

We claim:

1. A diffuser comprising:
   a rectangular frame with a top edge and a bottom edge;
   a base plate attached to said bottom edge at a base plate perimeter and having a gas inlet through which gas can flow;
   a top plate with an upper surface and an inner surface said top plate attached to said top edge at a top plate perimeter and having an aperture through which gas can flow;
   a flexible, generally gas-impermeable membrane lying above said top plate and attached to said top edge at a membrane perimeter, said membrane including a central porous portion with a boundary defined by an ellipse.

2. A diffuser as in claim 1 in which said frame is of a width "w" and a length "l", and said ellipse is defined by the equation $$\frac{x^2}{w^2} + \frac{y^2}{l^2} = \frac{1}{4}.$$

3. A diffuser as in claim 2 in which said top plate has a plurality of apertures.

4. A diffuser as in claim 3, in which said top plate has inner apertures and outer apertures, each of said inner apertures located at the centroid of an area of said top plate contained entirely within an ellipse defined by the equation $$\frac{x^2}{w^2} + \frac{y^2}{l^2} = \frac{1}{4},$$

said ellipse having a major axis bisecting said plate width and a minor axis bisecting said plate length, each inner aperture sized in proportion to its inner area by a uniform inner proportion, and each of said outer apertures located at the centroid of an outer area of said top plate lying entirely outside of said ellipse, each outer aperture sized in proportion to its outer area by a uniform outer proportion.

5. A diffuser as in claim 4 in which said outer proportion is twice said inner proportion.

6. A diffuser as in claim 4, in which said top panel has inner apertures and outer apertures, each of said inner apertures located at the centroid of an area of said top panel contained entirely within an ellipse defined by the equation $$\frac{x^2}{w^2} + \frac{y^2}{l^2} = \frac{1}{4},$$

said ellipse having a major axis bisecting said panel width and a minor axis bisecting said panel length, each inner aperture sized in proportion to its inner area by a uniform inner proportion, and each of said outer apertures located at the centroid of an outer area of said top panel lying entirely outside of said ellipse, each outer aperture sized in proportion to its outer area by a uniform outer proportion.

7. A diffuser as in claim 6 in which said outer proportion is twice said inner proportion.

8. A diffuser as in claim 3 in which said top panel has a plurality of apertures.

9. A diffuser as in claim 3 in which said width "w" is equal to said length "l".

10. A diffuser comprising:
a lower plenum chamber including a rectangular frame comprising first and second side wall members and first and second end wall members, each member having a top and bottom edge, said first and second side wall members each of a length "l" and lying generally parallel to one another and each of said first and second end wall members of a length "w" and lying generally parallel to one another, a rectangular bottom panel with a width "w" and a length "l" attached to said bottom edges at a bottom plate perimeter and having a gas inlet opening, a rectangular top panel with an inner side and an outer side said top panel having a width "w" and length "l" and attached to said top edges at a top panel perimeter, said bottom panel further having an aperture through which gas can flow;
a flexible rectangular membrane having a width "w" and a length "l" and joined to said top panel perimeter at a membrane perimeter, said membrane including a porous portion having uniformly distributed micro pores lying within an ellipse defined by the equation $$\frac{x^2}{w^2} + \frac{y^2}{l^2} = \frac{1}{4},$$

with a major axis bisecting said membrane width and a minor axis bisecting said membrane length, and a non porous, gas impermeable portion lying outside said ellipse.

11. A diffuser comprising:
a rectangular frame with a top edge having a width "w" and a length "l";
a flexible, generally gas-impermeable membrane attached to said top edge at a membrane perimeter, said membrane including a central porous portion with an elliptical boundary defined by the equation $$\frac{x^2}{w^2} + \frac{y^2}{l^2} = \frac{1}{4}.$$

* * * * *